Sept. 22, 1942.  W. P. COX  2,296,770
CAR TRUCK
Filed June 26, 1941   2 Sheets-Sheet 1
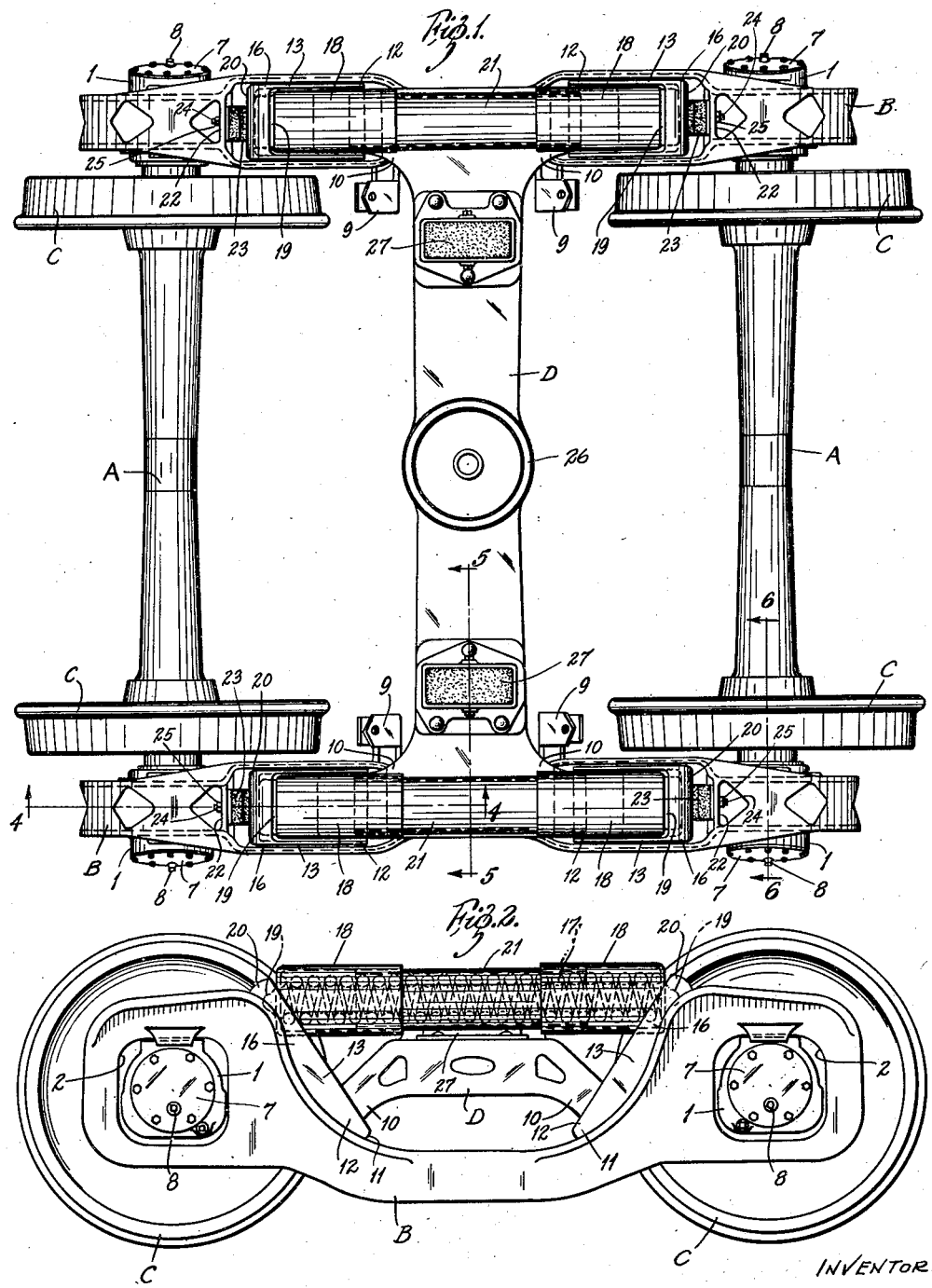

Sept. 22, 1942.  W. P. COX  2,296,770
CAR TRUCK
Filed June 26, 1941  2 Sheets-Sheet 2
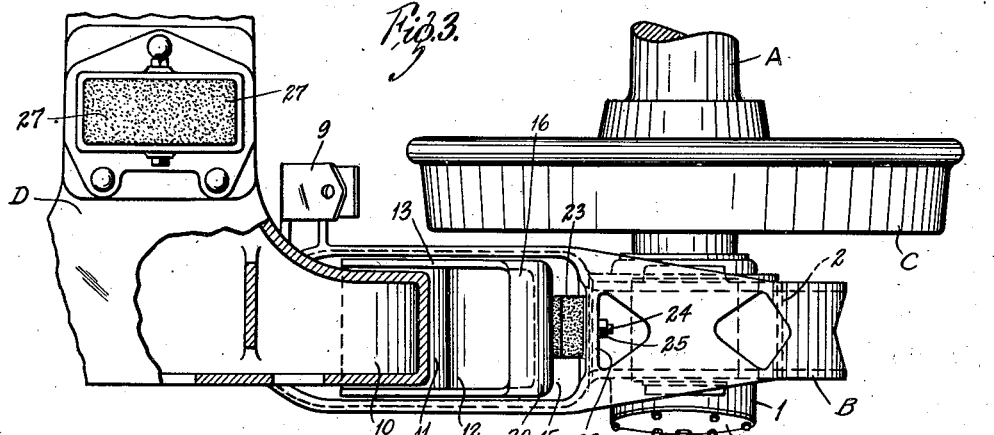
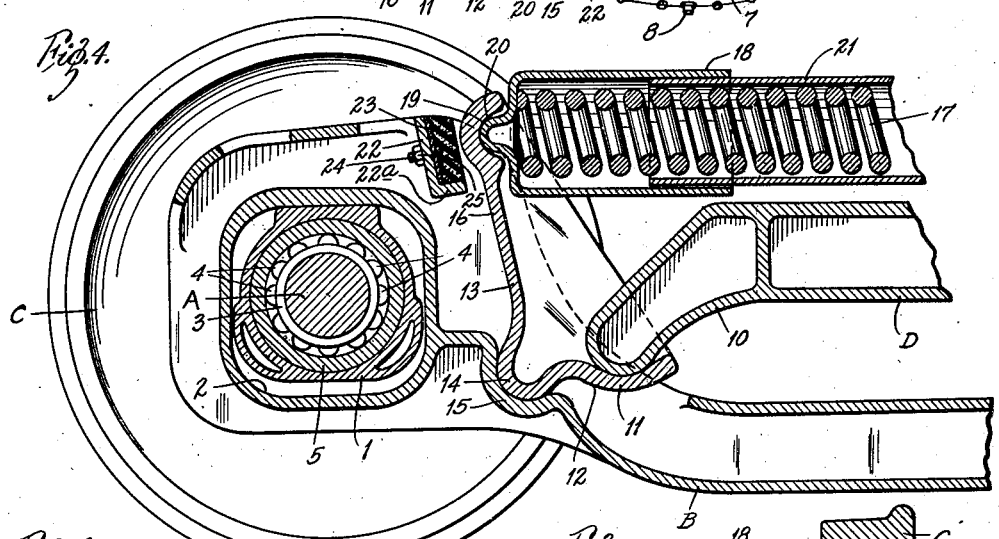
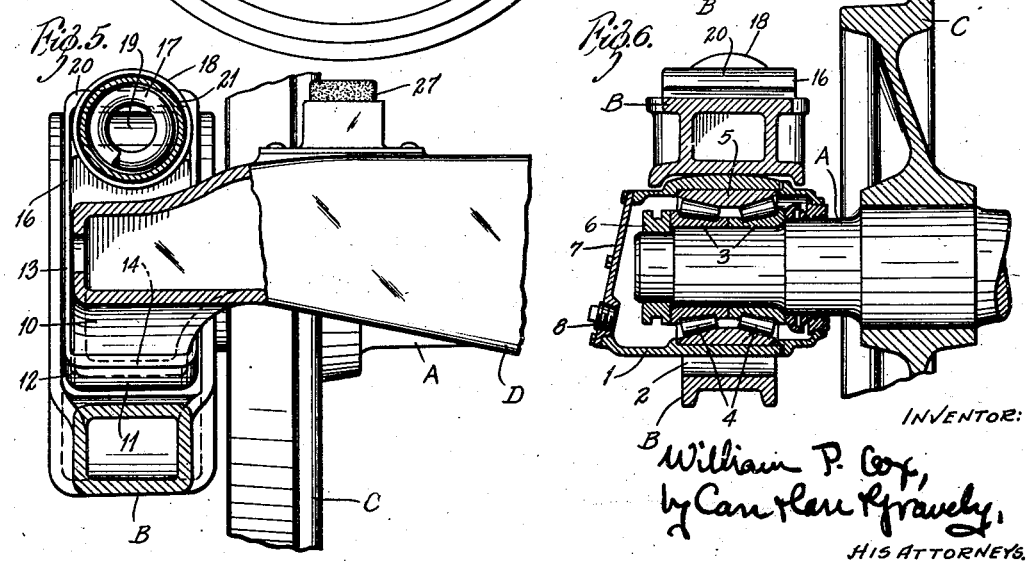
INVENTOR:
William P. Cox,
by Cautlen & Gravely,
HIS ATTORNEYS Patented Sept. 22, 1942

2,296,770

UNITED STATES PATENT OFFICE 2,296,770

CAR TRUCK

William P. Cox, Canton, Ohio, assignor to The Timken Roller Bearing Company, Canton, Ohio, a corporation of Ohio Application June 26, 1941, Serial No. 399,777

11 Claims. (Cl. 105—197.2)

My invention relates to railway car trucks and has for its principal objects to devise a car truck with improved riding qualities which is of simple and economical construction.

The invention consists principally in providing the ends of the bolster with diverging arms extending transversely thereof which are supported in the lower lever portions of bell crank rocker members rockably supported on the side frame and providing springs for spreading apart the upper lever portions of the bell crank rocker members. It further consists in the truck and in the parts and combinations and arrangements of parts hereinafter described and claimed.

In the accompanying drawings, which form part of this specification and wherein like reference characters refer to like parts wherever they occur, Fig. 1 is a plan view of a car truck embodying my invention, Fig. 2 is a side elevational view of said truck, Fig. 3 is a plan view of a portion of the truck with the spring and its casing omitted and with a corner portion of the bolster shown in section.

Fig. 4 is an enlarged sectional view taken on the line 4—4 in Fig. 1,

Fig. 5 is an enlarged sectional view taken on the line 5—5 in Fig. 1; and

Fig. 6 is an enlarged sectional view taken on the line 6—6 in Fig. 1.

The car truck comprises generally a pair of axles A connected at their ends by a pair of underslung or drop side frames B, wheels C mounted on said axles A adjacent to the inner sides of the side frames and a bolster D.

The drop side frame members B connect journal boxes 1 which extend through openings 2 in said side frames and are rockable therein. Said journal boxes enclose the several journals of the axles A and may be of any suitable construction. In the construction shown, roller bearings are mounted on each axle journal within the journal boxes and each comprises two inner raceway members or cones 3, two series of tapered rollers 4 and a double outer raceway member or cup 5. An annular retaining member 6 is pressfitted on the end of the axle to retain the parts in position. A suitable journal box lid 7 is provided having a threaded plug 8 screwed in a threaded opening at the lower end thereof. The side frames are provided with suitable brake hangers 9 adjacent to the wheels extending inwardly from the inner sides thereof.

Each end of the bolster D has two arms 10 extending outwardly and downwardly from the sides of said bolster. The end of each arm is rounded and is supported in a rounded seat 11 in the lower and shorter lever portion 12 of a bell crank rocker member 13. The fulcrum or apex of each bell crank rocker member 13 has a convex boss 14 supported in a concave seat 15 provided in the side frame. The upper and longer lever portions 16 of the bell crank rocker members on the same side of the truck are spread apart by a coil spring 17, said spring being strong enough to resist the force of the bolster weight on said rocker members. Each end of each spring adjacent to a bell crank member is enclosed in a cap or housing 18 having a convex boss 19 seating in a concave seat 20 in the upper and longer lever portion of the bell crank rocker member. These caps telescope over a tube 21 enclosing the central portion of the spring.

Integral with the side frames and adjacent to the upper portion of the bell crank rockers are small plates 22 having bottom flanges 22a. Rubber pads or bumpers 23 are secured to the plates with bolts 24 and nuts 25 extending through the pad and plate.

The bolster D is shown provided with a suitable center plate ring 26 formed integral therewith and it is also provided with suitable side bearings 27 secured thereto.

My construction has the important advantage that it provides a great spring deflection for normal or ordinary bolster or body action. Consequently, it makes for a soft spring action and easy riding qualities.

Obviously, numerous modifications may be made without departing from the invention and I do not want to be limited to the precise construction shown.

What I claim is:

1. A car truck comprising wheeled axles, side frames connecting said axles, a bolster, each end of said bolster having arms extending transversely thereof, rocker members rockably supported on said side frames below and beyond the ends of said arms, said arms being supported on said rocker members, and springs extending from rocker member to rocker member for resisting the action of said bolster on said rocker members.

2. A car truck comprising wheeled axles, side frames connecting said axles, a bolster, the ends of said bolster having arms extending outwardly and downwardly from the sides thereof, bell crank rocker members rockably supported on said side frames, said bolster arms being supported on said rocker members, and springs extending from rocker member to rocker member for resisting the action of said bolster on said rocker members.

3. A car truck comprising wheeled axles, side frames connecting said axles, a bolster, the ends of said bolster having arms extending transversely thereof, rocker members having vertically disposed upper and larger portions and horizontally disposed lower and shorter lower lever portions, said members rockably supported on said side frames, each of said arms being supported on one of said lower lever portions, and springs extending between and spreading apart said upper lever portions on the same side frame.

4. A car truck comprising wheeled axles, side frames connecting said axles, a bolster having arms at each end extending transversely thereof, bell crank rocker members having upper and lower lever portions, said members being rockably supported on said side frames, each of said arms seated in the lower lever portion of the adjacent rocker member and springs spreading apart said upper lever portions on the same side of said truck.

5. A car truck comprising wheeled axles, underslung side frames connecting said axles, a bolster having arms at each end extending outwardly and downwardly from the sides thereof, bell crank rocker members having upper and lower lever portions, said members rockably supported on said side frames, each of said arms being seated in the lower lever portion of the adjacent rocker members, and springs spreading apart said upper lever portions on the same side of said truck.

6. A car truck comprising wheeled axles, underslung side frames connecting said axles, a bolster having arms extending outwardly and downwardly from the sides thereof, bell crank rocker members each having a lower lever portion with a concave seat and an upper lever portion with a concave seat, said bell crank rocker members having convex bosses at the fulcrums thereof, said side frames having concave seats therein, said bosses seating in said seats, said arms seating in said seats in said lower lever portions, and springs spreading apart said upper lever portions.

7. A car truck comprising wheeled axles, underslung side frames connecting said axles, a bolster having arms extending outwardly and downwardly from the sides thereof, bell crank rocker members each having a horizontal lower lever portion with a concave seat and an upwardly extending lever portion with a concave seat, said bell crank rocker members having convex bosses at the fulcrums thereof, said side frames having concave seats therein, said bosses seating in said side frame seats, said arms seating in said seats in said lower lever portions, and springs spreading apart said upper lever portions, the ends of said springs extending between the upwardly extending lever portions and having caps with convex bosses at the ends thereof, said last mentioned bosses seating in said upper seats, tubes enclosing the central portions of said springs, said caps telescoping said tubes.

8. A car truck comprising wheeled axles, underslung side frames connecting said axles, a bolster having arms extending outwardly and downwardly from the sides thereof, bell crank rocker members each having a lower and shorter lever portion with a concave seat and an upper and longer lever portion with a concave seat, said bell crank rocker members having convex bosses at the fulcrums thereof, said side frames having concave seats, said bosses seating in said side frame seats, said arms seating in said seats in said lower portions, springs extending between and spreading apart said upper lever portions, the ends of said springs having caps with convex bosses at the ends thereof, said bosses seating in said upper seats, tubes enclosing the central portions of said springs, said caps telescoping said tubes and elastic bumpers adjacent to the upper lever portions of said bell crank rocker members.

9. A car truck comprising side frames, wheeled axles associated with said side frames, a bolster with spread ends, bell crank rocker members rockably mounted on the respective end portions of each side frame with relatively short arms extending horizontally toward each other and supporting the bolster and with relatively long arms extending vertically, and coil springs, each spring located between and bearing against the long arms of the two bell crank members on the respective side frames.

10. A car truck comprising side frames, wheeled axles associated with said side frames, a bolster with spread ends, bell crank rocker members rockably mounted on each side frame at points below the bolster and further apart than the width of its spread ends, the bell crank members of each side frame having relatively short arms extending horizontally toward each other and supporting the adjacent end of the bolster and having relatively long arms extending vertically, and coil springs, each spring being located between and bearing against the long arms of the bell crank members on the respective side frames.

11. A car truck comprising side frames and wheeled axles associated therewith, said side frames having concave seats between and adjacent to the respective axles, a bell crank rocker member having a convex portion rockably seated in each concave seat, one arm of said bell crank member extending horizontally and having a seat in the top thereof and the other arm extending vertically and having a seat in the side thereof, the vertically extending arm being longer than the horizontally extending arm, a bolster with its ends spread and bearing on the seats of the horizontally extending arms, and coil springs, each spring arranged to bear endwise against the seats in the respective long arms of the bell crank members associated with each side frame.

WILLIAM P. COX.